US010719663B2

(12) United States Patent
Johnson et al.

(10) Patent No.: US 10,719,663 B2
(45) Date of Patent: *Jul. 21, 2020

(54) ASSISTED FREE FORM DECISION DEFINITION USING RULES VOCABULARY

(71) Applicant: INTERNATIONAL BUSINESS MACHINES CORPORATION, Armonk, NY (US)

(72) Inventors: Peter John Johnson, Hursley (GB); Duncan George Clark, Hursley (GB); Christopher Paul Backhouse, Hursley (GB); David Locke, Hursley (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/184,763

(22) Filed: Nov. 8, 2018

(65) Prior Publication Data

US 2019/0095427 A1 Mar. 28, 2019

Related U.S. Application Data

(63) Continuation of application No. 14/473,453, filed on Aug. 29, 2014, now Pat. No. 10,180,938, which is a (Continued)

(30) Foreign Application Priority Data

Jun. 19, 2012 (GB) .................................. 1210811.4

(51) Int. Cl.
*G06F 17/00* (2019.01)
*G06F 40/30* (2020.01)
(Continued)

(52) U.S. Cl.
CPC ............. *G06F 40/30* (2020.01); *G06Q 10/10* (2013.01); *G06Q 30/02* (2013.01); *G06Q 30/06* (2013.01);
(Continued)

(58) Field of Classification Search
CPC ................................. G06F 17/28; G06F 17/00
See application file for complete search history.

(56) References Cited

U.S. PATENT DOCUMENTS 5,867,799 A 2/1999 Lang et al.
6,026,388 A 2/2000 Liddy et al.
(Continued)

FOREIGN PATENT DOCUMENTS

WO 1997021179 A1 6/1997
WO 2006002234 A2 1/2006
WO 2009002999 A2 12/2008

*Primary Examiner* — Feng-Tzer Tzeng
(74) *Attorney, Agent, or Firm* — Donald J. O'Brien

(57) ABSTRACT

A method of decision definition using a rules vocabulary includes: receiving free form input; identifying terms contained within the free form input; searching the rules vocabulary objects for terms; responsive to the term being found, obtaining input from a user as to whether to use the found term; responsive to the term not being found; searching the rules vocabulary attributes for terms having attributes corresponding to the term; responsive to the term being found, obtaining input from a user as to whether to use the found term; and refactoring the free form input with the found term accepted by the user. The method also includes updating the rules vocabulary with the term identified in the free form input as a synonym for the term found in said rules vocabulary. One embodiment further provides a method of determining semantic equivalence between a plurality of rules using a rules database having preferred terms.

20 Claims, 7 Drawing Sheets

Related U.S. Application Data continuation of application No. 13/921,349, filed on Jun. 19, 2013, now Pat. No. 10,296,585.

(51) Int. Cl.
| | |
|---|---|
| *G06Q 10/10* | (2012.01) |
| *G06Q 30/02* | (2012.01) |
| *G06Q 30/06* | (2012.01) |
| *G06F 16/00* | (2019.01) |
| *G06F 40/20* | (2020.01) |
| *G06F 40/40* | (2020.01) |
| *G06F 40/211* | (2020.01) |
| *G06F 40/247* | (2020.01) |
| *G06F 40/284* | (2020.01) |

(52) U.S. Cl.
CPC .............. *G06F 16/00* (2019.01); *G06F 17/00* (2013.01); *G06F 40/20* (2020.01); *G06F 40/211* (2020.01); *G06F 40/247* (2020.01); *G06F 40/284* (2020.01); *G06F 40/40* (2020.01)

(56) References Cited

U.S. PATENT DOCUMENTS

| | | |
|---|---|---|
| 6,026,988 A | 2/2000 | Teetsel et al. |
| 6,308,175 B1 | 10/2001 | Lang et al. |
| 6,434,552 B1 | 8/2002 | Leong |
| 6,665,666 B1 | 12/2003 | Brown et al. |
| 6,856,968 B2 | 2/2005 | Cooley et al. |
| 7,149,698 B2 | 12/2006 | Guheen et al. |
| 7,885,956 B2 | 2/2011 | Danish et al. |
| 7,885,968 B1 | 2/2011 | Hamamatsu et al. |
| 8,402,017 B2 | 3/2013 | Bender |
| 8,458,205 B2 | 6/2013 | Huang et al. |
| 8,515,966 B2 | 8/2013 | Jammalamadaka et al. |
| 8,667,021 B2 | 3/2014 | Grajo et al. |
| 9,535,949 B2 | 1/2017 | Beilmann et al. |
| 9,852,451 B1 | 12/2017 | Word |
| 10,180,938 B2 | 1/2019 | Johnson |
| 2003/0200208 A1 | 10/2003 | Sajwan et al. |
| 2004/0088158 A1* | 5/2004 | Sheu ................. G06F 16/24522 704/9 |
| 2005/0108001 A1 | 5/2005 | Aarskog |
| 2005/0289140 A1 | 12/2005 | Ford et al. |
| 2007/0220426 A1 | 9/2007 | Mueller et al. |
| 2008/0021884 A1* | 1/2008 | Jones .................... G06F 16/951 |
| 2008/0109318 A1 | 5/2008 | Szmanda |
| 2009/0002999 A1 | 1/2009 | Chang |
| 2009/0292528 A1 | 11/2009 | Kameyama |
| 2009/0319981 A1 | 12/2009 | Akkiraju et al. |
| 2010/0185643 A1 | 7/2010 | Rao et al. |
| 2011/0055185 A1 | 3/2011 | Bitan et al. |
| 2011/0153312 A1 | 6/2011 | Roberts |
| 2011/0246496 A1 | 10/2011 | Chung |
| 2012/0197751 A1 | 8/2012 | Zatkin et al. |
| 2012/0209594 A1 | 8/2012 | Agarwal et al. |
| 2012/0232897 A1 | 9/2012 | Pettyjohn et al. |
| 2012/0259882 A1* | 10/2012 | Thakur ............. G06Q 30/0625 707/767 |
| 2012/0303356 A1 | 11/2012 | Boyle et al. |
| 2013/0054419 A1 | 2/2013 | Yusko et al. |
| 2014/0289211 A1 | 9/2014 | Cao |

\* cited by examiner

ASSISTED FREE FORM DECISION DEFINITION USING RULES VOCABULARY

PRIORITY CLAIM

The present application is a continuation of U.S. patent application Ser. No. 14/473,453, filed Aug. 29, 2014, which is a continuation of U.S. patent application Ser. No. 13/921,349, filed on Jun. 19, 2013, which also claims benefit of priority under 35 USC § 120 and § 365 to the previously filed United Kingdom Patent Application No. 1210811.4 titled, "Assisted Free Form Decision Definition Using Rules Vocabulary" with a priority date of Jun. 19, 2012. The content of each application is incorporated by reference herein.

BACKGROUND

1. Technical Field

The present disclosure relates to computer-based decision definition and in particular to computer-based decision definition using a rules vocabulary.

2. Description of the Related Art

"Information Models and Systems", found at http://dret.net/lectures/infosys-ws06/infosys, discloses the semantic structure of documents including the use of rules. Rules are a formal or refined statement of a requirement that is expressed in a technology-independent fashion. The article also discloses the use of a controlled vocabulary that is a standardised set of terms to help searchers find information. A closed vocabulary can be thought of as a fixed or closed dictionary in which all rules are defined using the same set of terms. The article does not disclose how such a closed vocabulary might be built.

Another document provided at http://docs.oracle.com/html/E27987_01/toc.htm discloses the concept of transforming natural language expressions into executable rules. Rules are authored by a user using a word processor to define the rule. The building of a vocabulary is not disclosed.

The document found at http://www.prweb.com/releases/2006/07/prweb410401.htm discloses the writing of rules in natural language in a word processor, a drawing program, or a spreadsheet. A rule is defined based on an existing rule vocabulary. Keywords are not added or amended during the rule writing process.

"Evaluating Interfaces for Privacy Policy Rule Authoring" (Karet et al., CHI 2006 Proceedings, Apr. 22-27 2006, Montreal, Canada) discloses adding constraints to personal information at the policy level rather than at the operational vocabulary and rules levels. The document does not disclose authoring of rules using an expanded operational vocabulary.

"Building natural language interfaces for rule-based expert systems", Proceedings of the 10th international joint conference on Artificial intelligence—Volume 2 (IJCAI'87), Vol. 2. Morgan Kaufmann Publishers Inc., San Francisco, Calif., USA, 682-687 by Galina Datskovsky Moerdler, Kathleen R. McKeown, and J. Robert Ensor, 1987 discloses the mapping of a natural language into an expert system. The article does not disclose the evolution of vocabulary and rules in the expert system itself.

BRIEF SUMMARY

Embodiments of the present disclosure provide a computer-implemented method of decision definition using a rules vocabulary, the method comprising: receiving free form input; identifying terms contained within the free form input; searching the rules vocabulary objects for terms; responsive to the term being found, obtaining input from a user as to whether to use the found term; responsive to the term not being found, searching the rules vocabulary attributes for terms having attributes corresponding to the term; responsive to the term being found, obtaining input from a user as to whether to use the found term; and refactoring the free form input with the found term accepted by the user. The steps of this method provide the advantage of allowing an end user to generate rules in free from, but also allowing the use of a defined rules vocabulary with the benefits of a consistent usage of vocabulary and of attributes associated with the vocabulary.

In one embodiment, the terms are any of objects, attributes, values, relationships or verbs.

In one embodiment, the method further comprises the step of updating the rules vocabulary with the term identified in the free form input. This updating has the advantage of allowing the consistent rules vocabulary to be added to if there really is no term corresponding to the term used by the user pre-existing in the vocabulary.

In one embodiment, the method further comprises the step of updating the rules vocabulary with the term identified in the free form input as a synonym for the term found in the rules vocabulary. This updating has the advantage of allowing the user to use a term which is part of their natural language, but also having the advantage of using a term which is consistent with that used by other users.

In one embodiment, responsive to input from the user to not use the term found during the search of the rule vocabulary objects for terms, the rules vocabulary attributes are searched for terms having attributes corresponding to the term. This search has the advantage that if an object corresponding to the object in the input from the user is not found during a search for objects, then a corresponding object may be found by comparing the attributes of pre-existing objects in the rules database.

Embodiments of the present disclosure further provide a method of determining semantic equivalence between a plurality of rules using a rules database having preferred terms, comprising the steps of: identifying at least one of objects, attributes, values, relationships or verbs in each of the plurality of rules; replacing each of the at least one of objects, attributes, values, relationships, and verbs in each of the plurality of rules with a preferred term found in the rules database to form a plurality of amended rules; and comparing a first of the plurality of amended rules and a second of the plurality of amended rules; responsive to the comparison being true, then identifying the first of the plurality of rules and the second of the plurality of rules as being equivalent. This sequence of processes has the advantage of allowing a consistent set of rules to be used without duplication of rules but without restricting the terms used by a user.

In one embodiment the method further comprises the step of replacing generalised terms with semantically equivalent terms.

Embodiments of the present disclosure also provide a system and a computer program product for carrying out the method functions described above.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
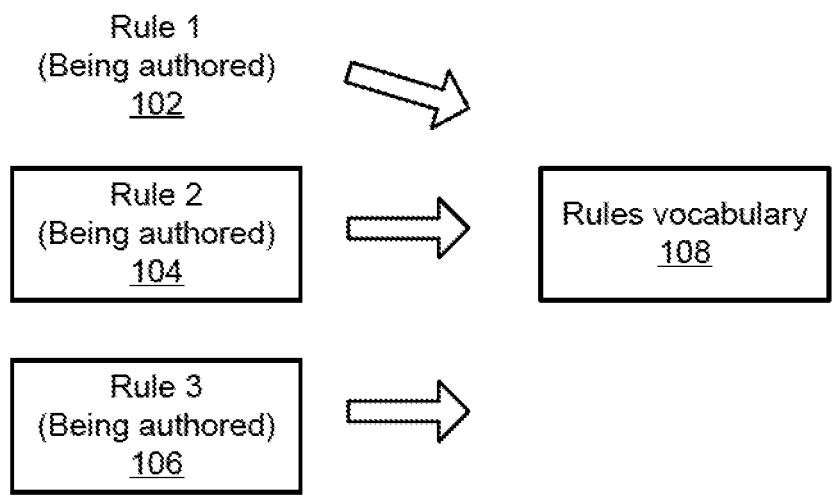
FIG. 1 shows three rules being processed to update a rules vocabulary.

In the following detailed description of exemplary embodiments of the disclosure, specific exemplary embodiments in which the disclosure may be practiced are described in sufficient detail to enable those skilled in the art to practice the disclosure, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

In the following detailed description, numerous specific details such as specific method orders, structures, elements, and connections have been set forth. It is to be understood however that these and other specific details need not be utilized to practice embodiments of the present disclosure. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It is understood that the use of specific component, device and/or parameter names (such as those of the executing utility/logic described herein) are for example only and not meant to imply any limitations on the disclosure. The disclosure may thus be implemented with different nomenclature/terminology utilized to describe the components/devices/parameters herein, without limitation. Each term utilized herein is to be given its broadest interpretation given the context in which that terms is utilized.

Those of ordinary skill in the art will appreciate that the hardware components and basic configuration depicted in the presented figures may vary. For example, the illustrative components within the data processing system (DPS 1000, FIG. 10) are not intended to be exhaustive, but rather are representative to highlight essential components that are utilized to implement the present disclosure. For example, other devices/components may be used in addition to or in place of the hardware depicted. The depicted example is not meant to imply architectural or other limitations with respect to the presently described embodiments and/or the general disclosure. The data processing system depicted in FIG. 10 may be, for example, an IBM eServer pSeries system, a product of International Business Machines Corporation in Armonk, N.Y., running the Advanced Interactive Executive (AIX) operating system or LINUX operating system.

Referring to FIG. 1, rule 1 102, rule 2 104 and rule 3 106 are shown. Each of the rules is a free form sentence in natural language describing a particular course of action which should be followed. Although FIG. 1 shows three rules, there may be any number of rules. An example might be "When the customer is less than 18 years old then reject the order". Another example might be "When the purchaser's age is more than 65 then apply 5% elderly person's discount to order". These rules are being authored by a user to, for example, allow them to be used to implement policies across a broad computing system or to allow a global policy to be implemented across different applications and contexts. When the rules are authored, they are then used to update a rules vocabulary 108.

Rules can be broken down into terms such as, for example, objects and attributes. Attributes may have values such as "18", "John Doe", "2BE" or "NOT2B" or they may reference other concepts such as "brother of . . . ". Using the first example above, the rule "When the customer is less than 18 years old then reject the order" can be broken down as follows:

"When the customer is less than 18 years old then

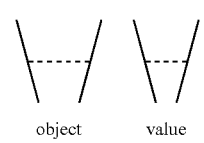

reject the order"

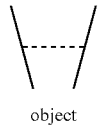
object

Similarly, using the second example above, the rule "When the purchaser's age is more than 65 apply 5% elderly person's discount to order" can be broken down as follows: "When the purchaser's age is more than 65 then

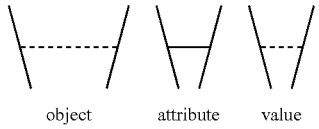
object    attribute    value apply 5% elderly person's discount to order"

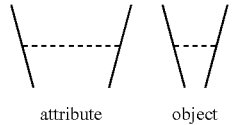
attribute    object

Figure 2:
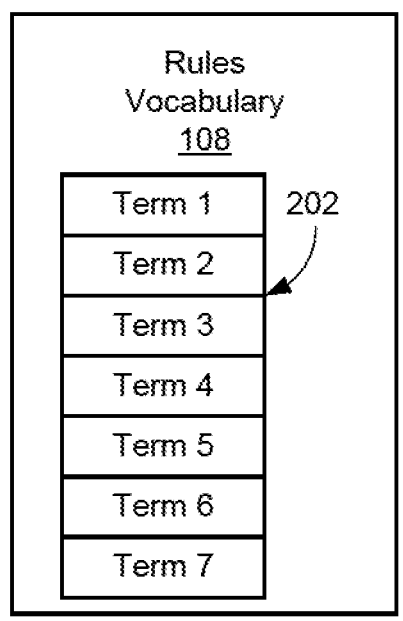
FIG. 2 shows the rules vocabulary of FIG. 1.

FIG. 2 shows a rules vocabulary 108 comprising terms 202. Terms 202 are, for example, objects or attributes or relationships such as "brother of . . . ". Although seven terms are shown, there may be a single term or any number of terms. Rules vocabularies 108 may be general purpose or they may be specialised for particular purposes, users, industries or the like.

Figure 3:
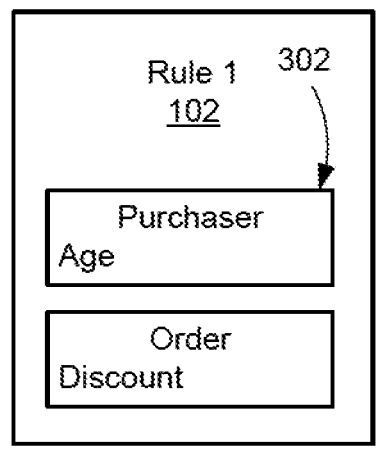
FIG. 3 shows a local vocabulary associated with one of the rules of FIG. 1 before consolidation with the rules vocabulary of FIG. 1.

FIG. 3 shows a local vocabulary for the second example above. The vocabulary is "local" because that is the scope of the sharing, i.e. the local vocabulary is a subset of the global vocabulary that is local to the user of the vocabulary. A first object "Purchaser" is shown. The object "Purchaser" has one attribute "age". A second object "Order" is also shown. The object "Order" also has one attribute "discount". These correspond with the terms in the breakdown of the rule in the second example above.

Figure 4:
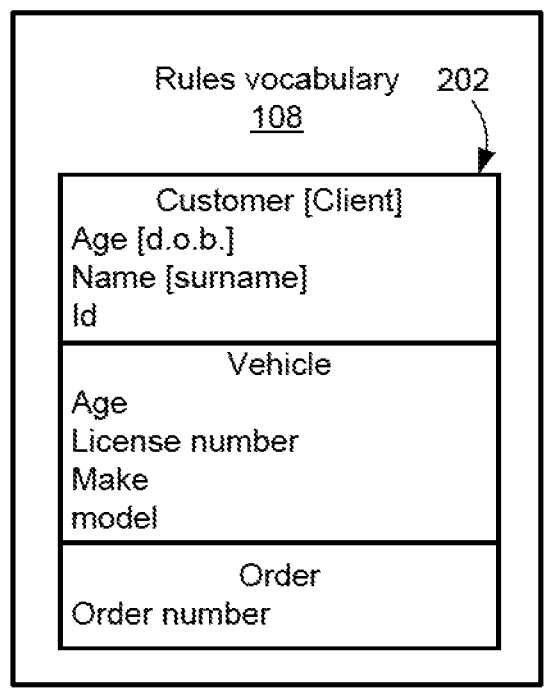
FIG. 4 shows the rules vocabulary of FIG. 1 before consolidation with the local vocabulary associated with one of the rules of FIG. 1.

FIG. 4 shows an example rules vocabulary 108 containing terms 202. A first object "Customer" is shown. That object has a synonym of "Client", so that either term can be used interchangeably. The object "Customer" has three attributes, "age", "name" and "id". The attribute "age" has a synonym of "d.o.b." (date of birth) and the attribute "name" has a synonym of "surname". The object "Vehicle" has four attributes, "age", "license number", "make" and "model". The object "Order" has one attribute "order number".

Figure 5:
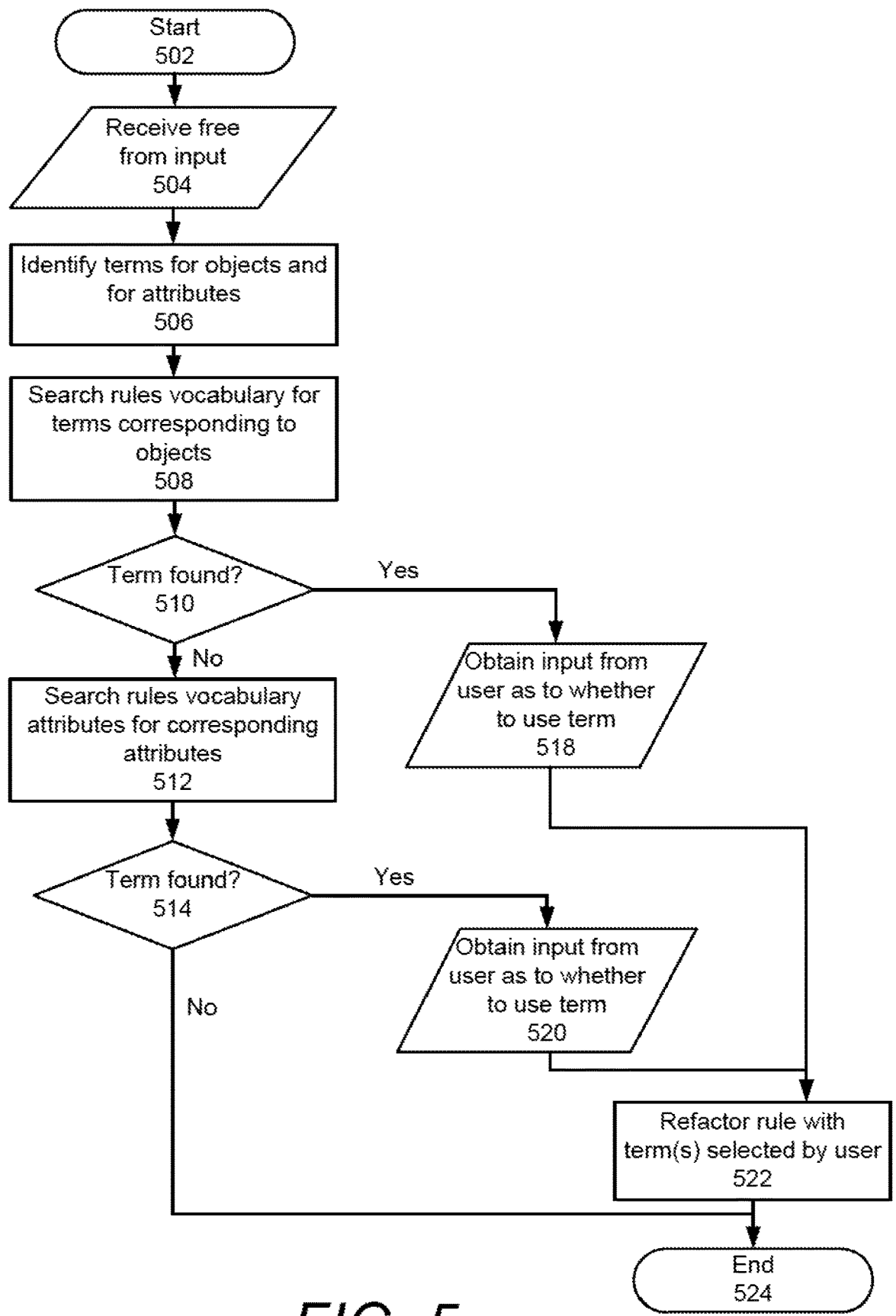
FIG. 5 shows a flow diagram of an embodiment of the disclosure in which a rules vocabulary is searched for objects and for attributes.

FIG. 5 shows a flow diagram of an embodiment of the present disclosure used to update a rules vocabulary 108, such as that shown in FIG. 1, from free form input rules 102, 104, 106. The process starts at step 502. Free form input, such as the rules 102, 104, 106 described in the two examples above is received from a user at step 504. At step 506, the free form input is analysed to identify terms such as objects, attributes, values and relationships. In the second example above, the object "Purchaser" has an attribute of "age" and the object "order" has an attribute of "discount". This analysis can be done by known methods such as syntactic analysis or by parsing or by pattern matching. At step 508, the terms 202 in the rules vocabulary 108 are searched for terms corresponding to the objects found during the analysis step 506. In this example, the search is for the objects "Purchaser" and "order".

At step 510, if the search is successful and the object is found in the rules vocabulary 108, then the found object is presented to the user as a candidate for the object in the rule 102, 104, 106. In the second example above, the search of the rules database 108 for the object "Purchaser" will find the object "Customer", which already has a synonym of "Client".

At step 518, the user is presented with the object found and its associated attributes, that is "Customer", with a synonym of "Client" and attributes of "age", "name" and "id". The user is asked whether this object is the one that should be used, i.e. should "Customer" be used instead of "Purchaser", optionally should "Purchaser" be added as a synonym of "Customer" or optionally should "Purchaser" not be treated as the same as or a synonym of "Customer", i.e. "Purchaser" and "Customer" are to be treated as disjoint. At step 522, if the user agrees that this object ("Customer") is the one that should be used, or that "Purchaser" be added as a synonym of "Customer", then the rule is reworded using the object "Customer" in place of "Purchaser". In one embodiment, not shown in FIG. 5, the user is offered the option of adding the searched term to the existing vocabulary. The process then ends at step 524.

If the search at step 508 is unsuccessful and the object is not found in the rules vocabulary 108, then at step 512 another search of the attributes in the rules database 108 is carried out for attributes corresponding to those found in the rule. In the second example above, the attributes are "age" and "discount". At step 514, if the search is successful and a corresponding attribute is found in the rules vocabulary 108, then the found attribute is presented, at step 520, to the user as a candidate for the attribute in the rule 102. In the second example above, the search of the rules database 108 will find the attribute "age", associated with the object "Customer" in addition to the attribute "age", associated with the object "Vehicle". The user selects which of the two objects is the appropriate one to use. In a preferred embodiment, not shown in FIG. 5, the user is offered the option of adding the searched term to the existing vocabulary. At step 522, if the user agrees that this object ("Customer") is the one that should be used, or that "Purchaser" be added as a synonym of "Customer", then the rule is reworded using the object "Customer" in place of "Purchaser". The process then ends at step 524.

At step 514, if the search is unsuccessful and a corresponding attribute is not found in the rules vocabulary 108, the process then ends at step 524.

Figure 6:
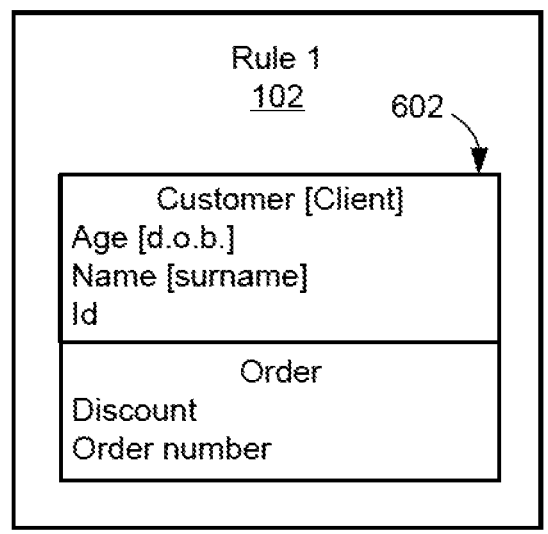
FIG. 6 shows the local vocabulary of FIG. 3 after consolidation with the rules vocabulary of FIG. 4.

FIG. 6 shows the local vocabulary of FIG. 3 used in the second example above after consolidation with the rules vocabulary of FIG. 4. The first object "Purchaser" having one attribute "age" has been replaced by a first object "Customer" having three attributes "age, "name" and "id". The user entered "Purchaser" as an object, but a search of the rules vocabulary found "Customer" as an object which already existed in the rules vocabulary and which was likely to be an equivalent object. The user agreed at step 522 of the process shown in FIG. 5 that the term should be replaced. As it is already known that the object "Customer" in the rules vocabulary has attributes of "name" and "id" as well as "age", then these additional attributes are added to the local vocabulary for the object "Customer". The synonyms "d.o.b." and "surname" found in the rules vocabulary have been added to the attributes "age" and "name" respectively.

A second object "Order" is also shown in FIG. 3 having a single attribute "discount". The user entered "Order" as an object and the term was found. However, the object "Order" in the rules vocabulary had two attributes "discount" and "order number". As it is already known that the object "Order" in the rules vocabulary has attributes of "order number" as well as "discount", then in the local vocabulary of FIG. 6, this additional attribute is added to the local vocabulary for the object "Order".

Figure 7:
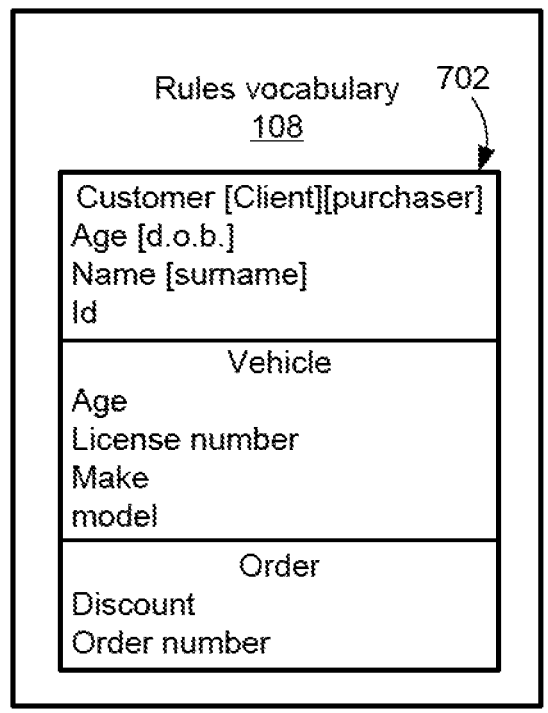
FIG. 7 shows the rules vocabulary of FIG. 4 after consolidation with the local vocabulary of FIG. 3.

FIG. 7 shows the example rules vocabulary of FIG. 4 used in the second example above after consolidation with the local vocabulary of FIG. 3. A first object "Customer" is shown having a synonym of "Client", so that either term can be used interchangeably. A further synonym of "Purchaser" has been added so that this can also be used interchangeably. The object "Order" is shown having an attribute "order number". A further attribute of "discount" has been added to the object "Order".

Figure 8:
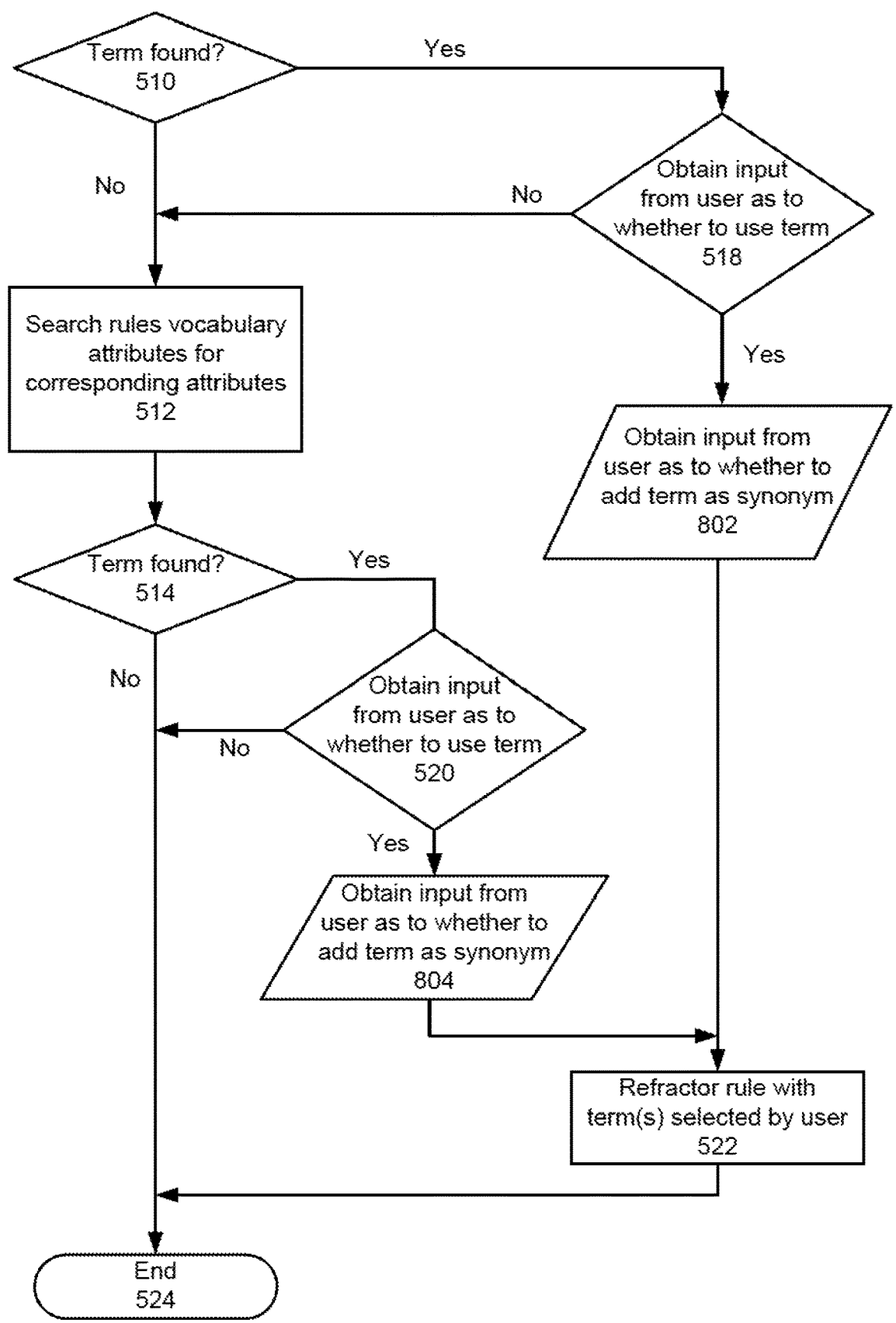
FIG. 8 shows another embodiment of the disclosure in which a user is prompted as to whether to add a found term as a synonym.

FIG. 8 shows a flow diagram of another embodiment of the present disclosure in which a user is prompted as to whether or not to add a found term as a synonym and also in which a search of attributes in the rules vocabulary 108 is completed if a user does not accept a term found in the search of the rules vocabulary 108 for objects. The step 510 in FIG. 8 is the same step 510 as shown in FIG. 5. Similarly, steps 512, 514, 518, 520, 522 and 524 are the same steps as shown in FIG. 5.

At step 518, if the user does not accept the term, then processing proceeds to step 512 where the vocabulary term attributes are searched for attributes which correspond to the searched term. If the user does accept the term, then at step 802, input is obtained from the user as to whether to add the term accepted by the user at step 518 to the rules vocabulary 108 as a synonym. Processing then continues at step 522 described above with reference to FIG. 5.

At step 520, if the user does not accept the term, then processing ends at step 524. If the user does accept the term, at step 804, input is obtained from the user as to whether to add the term accepted by the user at step 520 to the rules vocabulary 108 as a synonym. Processing then continues at step 522 described above with reference to FIG. 5.

In another embodiment of the disclosure, the rules vocabulary 108 is searched for verbs, such as "reject" or "approve" instead of attributes, such as "age". In a variation of this embodiment, the rules vocabulary is searched for both attributes and for verbs.

In a further embodiment of the disclosure, the rules vocabulary 108 is searched for synonyms of attributes in the same way as synonyms of objects are searched. In a variation of this embodiment, synonyms of verbs are searched instead of synonyms for attributes, or as well as synonyms for attributes.

In another embodiment of the disclosure, semantically equivalent rules which infer the same conditional statement can be identified. For example, the two rules:
"When the customer is less than 18 years old then

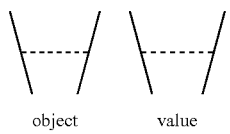

object    value reject the order"

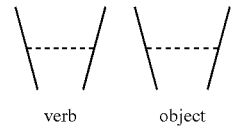

verb    object and
"If the client's age is not greater than 18 then refuse the

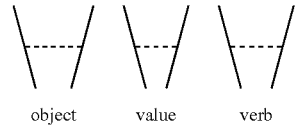

object    value    verb sale"

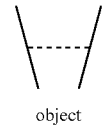

object are semantically equivalent.

Figure 9:
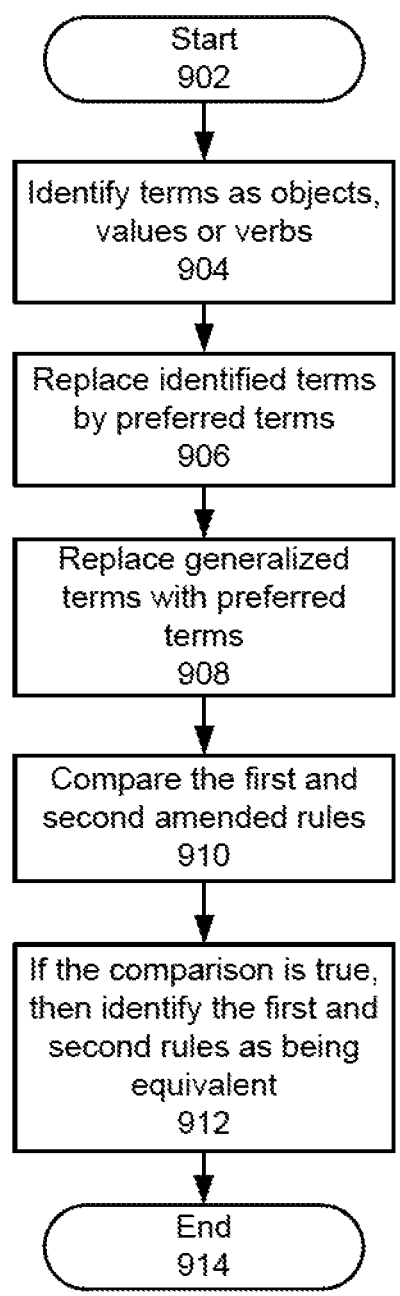
FIG. 9 shows an embodiment of the present disclosure in which a plurality of rules is compared for equivalence.

Referring to FIG. 9, the process is started at step 902. In order to determine whether two rules are semantically equivalent, the rules first have their objects, values and verbs identified at step 904. Any combination or permutation of objects, values, verbs or other term such as relationships may be identified, but for the following example, objects, values and verbs will be identified.

In the first rule, the term "customer" is identified as an object, the number "18 years" is identified as a value, the term "reject" is identified as a verb, and the term "order" is identified as an object. In the second rule, the term "client" is identified as an object, the number "18" is identified as a value, the term "refuse" is identified as a verb, and the term "sale" is identified as an object.

At step 906, each object, value or verb is replaced in each of the rules by the preferred term, i.e. if the object, value or verb used in the rule is identified as a synonym, then that usage is replaced by the term in the rules database with which it is associated with.

In the first rule, "customer" is a preferred term and so the term "customer" remains. The number "18 years" is identified as a synonym for "18" and so "18 years" is replaced by "18". The verb "reject" is identified as a synonym for "refuse" and so the verb "reject" is replaced by "refuse". The object "order" is identified as a preferred term and so it remains. The first rule now reads "When the customer is less than 18 then refuse the order".

In the second rule, "client" is identified as a synonym for "customer" and so "client" is replaced by "customer". The number "18" is identified as a preferred term and so "18" remains. The verb "refuse" is identified as a preferred term and so the verb "refuse" remains. The object "sale" is identified as a synonym for "order" and so "sale" is replaced with "order". The second rule now reads "If the customer's age is not greater than 18 then refuse the order".

Either before or after the replacement of the terms, some generalized terms are replaced with semantically equivalent preferred terms. For example, "less than" and "not greater than" are semantically equivalent. In this case adjustments may also have to be made to the value as "less than" does differ from "not greater than" for the boundary condition of 18 years of age. As an example, the value "18" may be replaced by the value "17.99" in the second rule when "not greater than" is compared for semantic equivalence with "less than". This step is shown in FIG. 9 at step 908.

At step 910, the amended first rule and the amended second rules are compared for equivalence. This comparison may be an absolute comparison or it may be a comparison that disregards differences which are either minor or of a specified type which does not affect the meaning of the rules.

At step 912, responsive to the comparison between the amended first rule and the amended second rule being true, then the first rule and the second rule are identified as being equivalent. Optionally, appropriate changes may be made to the rules database to ensure that future rules equivalent to the first and second rule use the preferred terms. The process ends at step 914.

Figure 10:
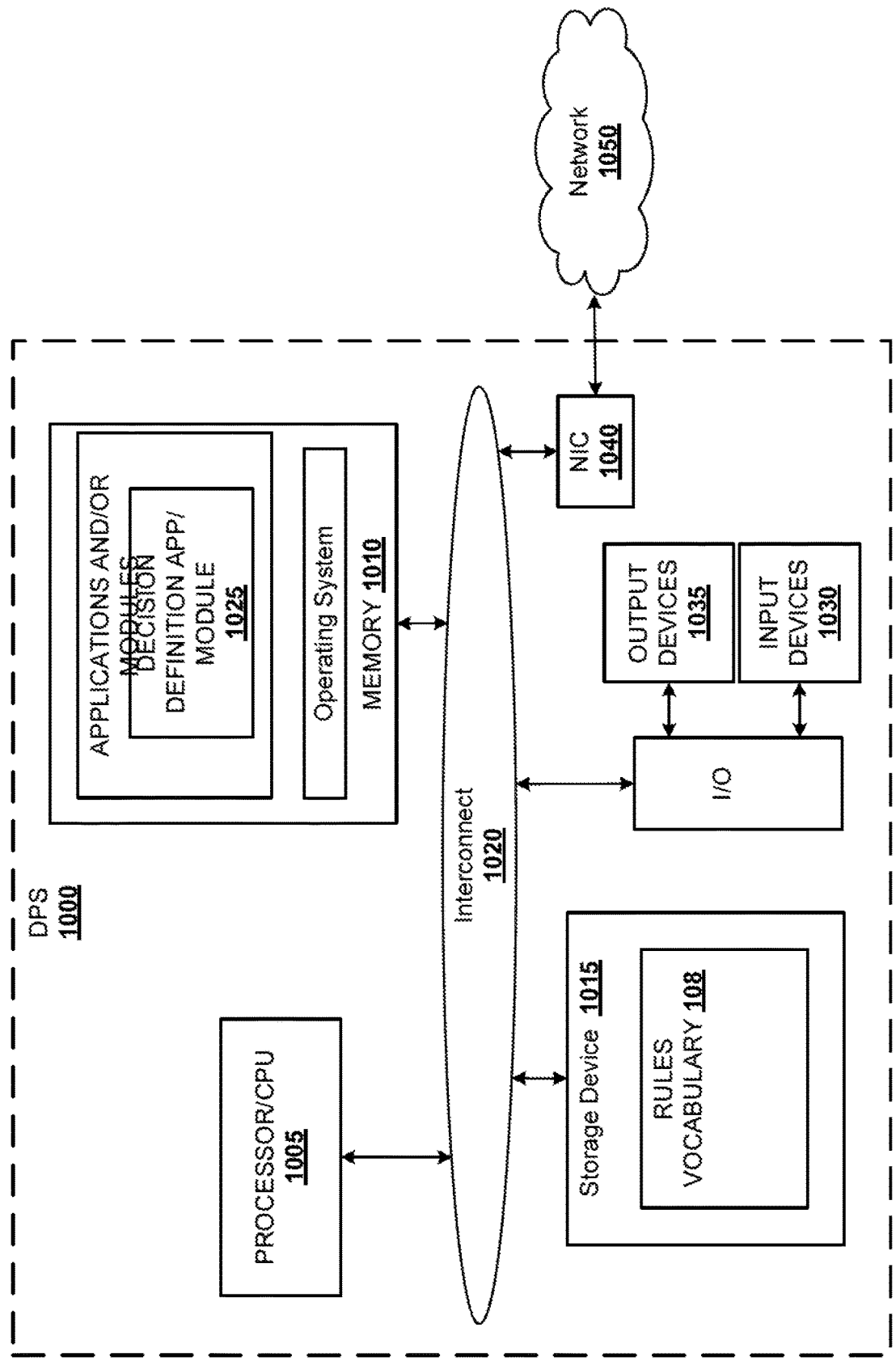
FIG. 10 is a block diagram illustration of an example data processing system within which the various features of the described embodiments can be implemented.

The various function aspects of the disclosure are carried out by execution of program code and/or program instructions on a processor of a computer or data processing system (DPS). FIG. 10 illustrates an example data processing system, which includes processor 1005, memory 1010, and storage device 1015, which are all communicatively interconnected via a system bus or interconnect 1020. Within memory 1010 are one or more applications and or executable modules, including decision definition application/module 1025, which executes on processor 1005 to configure the processor to perform the various processes described herein. Storage device 1015 includes therein rules vocabulary 108, among other stored components. DPS 100 also comprises one or more input/output devices, including general input device 1030 and general output device 1035, which are also communicatively coupled to processor 1005 via system interconnect 1020. As shown, DPS 1000 can be connected to an external network 1050 via a network interfacing card (NIC) 1040.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

As will be appreciated by one skilled in the art, aspects of the present disclosure may be embodied as a system, method or computer program product. Accordingly, aspects of the present disclosure may take the form of an entirely hardware embodiment or an embodiment combining software (including, for example, firmware, resident software, micro-code, etc.) and hardware aspects that may all generally be referred to herein as a "circuit," "module" or "system." Furthermore, aspects of the present disclosure may take the form of a computer program product embodied in one or more computer readable storage devices or other computer readable medium(s) having computer readable program code embodied thereon.

Any combination of one or more computer readable medium(s) may be utilized. The computer readable medium may be a computer readable signal medium or a computer readable storage device. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage device and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can configure a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the disclosure may be practiced by combining one or more machine-readable storage devices containing the code according to the present disclosure with appropriate processing hardware to execute the code contained therein. An apparatus for practicing the disclosure could be one or more processing devices and storage systems containing or having network access to program(s) coded in accordance with the disclosure.

Thus, it is important that while an illustrative embodiment of the present disclosure is described in the context of a fully functional computer (server) system with installed (or executed) software, those skilled in the art will appreciate that the software aspects of an illustrative embodiment of the present disclosure are capable of being distributed as a program product in a variety of forms, and that an illustrative embodiment of the present disclosure applies equally regardless of the particular type of media used to actually carry out the distribution.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While particular embodiments of the present disclosure have been shown and described, it will be obvious to those skilled in the art that, based upon the teachings herein, changes and modifications may be made without departing from this disclosure and its broader aspects. Consequently, the appended claims are to encompass within their scope all such changes and modifications as are within the true spirit and scope of this disclosure and embodiments of the disclosure are intended to be limited only by the scope of the appended claims, giving full cognizance to equivalents in all respects.

The invention claimed is:

1. A computer-implemented method of decision definition using a rules vocabulary, the method comprising:
   receiving, via at least one input device of a data processing system, at least one rule of the rules vocabulary to be enforced within the data processing system, wherein each of the at least one rule is received as a free form sentence in natural language;
   the data processing system identifying a first term from among one or more terms contained within the at least one rule, wherein the at least one rule describes an action of the data processing system;
   searching in a rules vocabulary for a term corresponding to the first term, wherein the rules vocabulary is stored within a storage device that is communicatively interconnected with a processor of the data processing system; and
   in response to the term corresponding to the first term not being found:
   searching in the rules vocabulary for at least one attribute of the at least one rule;
   in response to the at least one attribute being found:
      presenting, on an output device of the data processing system the at least one found attribute, wherein the at least one found attribute includes at least one reference that describes a relationship with the term corresponding to the first term;
      receiving, via the at least one input device, a first input identifying whether to replace the first term with the found at least one attribute within the at least one rule;
      in response to the first input indicating the found at least one attribute is to replace the first term:
         refactoring each of the at least one rule by replacing the first term with the found at least one attribute in each of the at least one rule;
         implementing a policy within the data processing system using the refactored at least one rule as a replacement of the at least one rule, wherein the policy designates a particular course of action of the data processing system;

presenting, on the output device of the data processing system, an inquiry that includes a first option for adding the found at least one attribute to the rules vocabulary as a synonym for the first term and a second option for declining adding the found at least one attribute to the rules vocabulary as the synonym for the first term;

receiving, via the at least one input device, a response to the inquiry that includes a selected option from among the first option and the second option; and in response to determining the response to the inquiry indicating a selected option that is the first option, adding the found at least one attribute to the rules vocabulary as the synonym for the first term.

2. The method of claim 1, wherein the terms include one of objects, attributes, values, relationships, and verbs.

3. The method of claim 1, further comprising:
in response to the term being found:
   receiving, via the at least one input device, an input that indicates whether the found term is to be added to the rules vocabulary; and
   in response to the input indicating that the found term is to be added to the rules vocabulary, updating the rules vocabulary with the first term.

4. The method of claim 1, further comprising:
analyzing the at least one rule to identify at least one attribute within the at least one rule that corresponds to the first term, wherein the at least one attribute comprises at least one of: a value that describes the first term and a relationship associated with the first term;
in response to the term not being found:
   searching the rules vocabulary for the at least one attribute; and
   in response to finding the at least one attribute in the rules vocabulary:
      identifying, within the rules vocabulary, at least one other term that is associated with the at least one attribute;
      presenting, on the output device of the data processing system, the at least one other term as a candidate to replace the first term;
      in response to presenting the at least one other term as the candidate to replace the first term, receiving, via the at least one input device of the data processing system, a first response that indicates whether the at least one other term is accepted and is to be used to replace the first term in the at least one rule; and
      in response to determining the first response indicates that the at least one other term has been accepted and is to be used:
         presenting, on the output device of the data processing system, a request that includes a first option for adding the at least one other term to the rules vocabulary as the synonym for the first term and a second option for declining addition of the at least one other term to the rules vocabulary as the synonym for the first term;
         receiving, via the at least one input device, a second response that includes a selected option from among the first option and the second option;
         in response to determining the selected option is the first option, adding the at least one other term to the rules vocabulary as the synonym for the first term;
         refactoring each of the at least one rule by replacing the first term with the at least one other term; and
         implementing a new policy within the data processing system using the refactored at least one rule, wherein the policy designates the particular course of action of the data processing system.

5. The method of claim 1, further comprising:
in response to the first input indicating the term corresponding to the first term is not to be used to replace the first term, searching the rules vocabulary for at least one synonym of at least one attribute within the at least one rule that corresponds to the first term; and
in response to finding, in the rules vocabulary, the at least one synonym of the at least one attribute, presenting, on the output device of the data processing system, the at least one synonym as the candidate to replace the first term.

6. The method of claim 1, wherein the at least one found attribute further includes at least one of: values that describe the term corresponding to the first term and synonyms of the term corresponding to the first term.

7. The method of claim 1, further comprising:
in response to the first input indicating the term corresponding to the first term is to replace the first term:
   presenting, on the output device of the data processing system, the inquiry, wherein the inquiry includes a first option for adding the term corresponding to the first term to the rules vocabulary as the synonym for the first term and a second option for declining addition of the term corresponding to the first term to the rules vocabulary as the synonym for the first term;
   receiving, via the at least one input device, a response to the inquiry that includes a selected option from among the first option and the second option; and
   in response to determining the response to the inquiry indicating a selected option that is the first option, adding the term corresponding to the first term to the rules vocabulary as the synonym for the first term.

8. The method of claim 1, wherein the rules vocabulary is a local subset of a global vocabulary.

9. The method of claim 1, wherein the rules vocabulary is updated to identify the first as a synonym for the at least one other term.

10. The method of claim 1, further comprising:
identifying at least one of objects, attributes, values, relationships, and verbs in each of the at least one rule;
determining, for each of the at least one of objects, attributes, values, relationships, and verbs in each of the at least one rules, whether there exists in the rules vocabulary a synonym term that is identified as a preferred term; and
in response to identifying a synonym term for at least one of the objects, attributes, values, relationships, and verbs in each of the at least one rule replacing the at least one of objects, attributes, values, relationships or verbs in each of the at least one rules with the preferred term to form a plurality of amended rules.

11. The method of claim 1, wherein the at least one other term is a synonym for the term.

12. The method of claim 11, further comprising:
comparing a first amended rule of the plurality of amended rules to others of the plurality of amended rules for equivalence; and
in response to the comparison indicating that the first amended rule and a second amended rule from among the plurality of amended rules are equivalent:
identifying the first amended rule and the second amended rule as being equivalent; and
configuring the rules database to refactor any future rules that are identified as equivalent to the first and second amended rules to utilize the preferred terms in the first and second amended rules.

13. The method of claim 12, further comprising:
replacing one or more generalized terms in the at least one rule with one or more semantically equivalent terms.

14. The method of claim 12, wherein the comparison is an absolute comparison.

15. The method of claim 12, wherein comparing the first amended rule and the second amended rule further comprises:
disregarding, between the first amended rule and the second amended rule, one or more differences of a specified type that do not affect a meaning of the first amended rule and the second amended rule.

16. The method of claim 1, wherein the policy is a global policy that is implemented across a plurality of applications and contexts of a broad data processing system that includes the data processing system.

17. The method of claim 12, wherein the at least one of objects, attributes, values, relationships or verbs includes at least one verb, and wherein the preferred term is a verb.

18. The method of claim 1, wherein an attribute defines, for a corresponding term, at least one of:
a value of at least one value that is associated with the corresponding term; and
a relational concept associated with the corresponding term.

19. The method of claim 1, wherein searching the rules vocabulary for at least one other term further comprises:
searching the rules vocabulary for at least one other attribute that is associated with the at least one other term and identified as a synonym for the at least one attribute.

20. The method of claim 1, wherein presenting the at least one other term as a candidate to replace the first term further comprises:
presenting, on the output device of the data processing system, a first candidate term and at least one second candidate term for selection to replace the first term, wherein only one term from among the first candidate term and the at least one second candidate term may be selected to replace the first term, wherein the first response indicates a selected replacement term from among the first candidate term and the at least one second candidate term, and wherein the at least one other term is the selected replacement term.

* * * * *